US007346193B2

(12) United States Patent
Kurokawa

(10) Patent No.: US 7,346,193 B2
(45) Date of Patent: Mar. 18, 2008

(54) METHOD FOR DETECTING OBJECT TRAVELING DIRECTION

(75) Inventor: Natsuki Kurokawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 221 days.

(21) Appl. No.: 10/550,954

(22) PCT Filed: Aug. 26, 2004

(86) PCT No.: PCT/JP2004/012689

§ 371 (c)(1),
(2), (4) Date: Sep. 28, 2005

(87) PCT Pub. No.: WO2005/024726

PCT Pub. Date: Mar. 17, 2005

(65) Prior Publication Data

US 2006/0193495 A1 Aug. 31, 2006

(30) Foreign Application Priority Data

Sep. 2, 2003 (JP) ............................. 2003-309902

(51) Int. Cl.
*G06K 9/00* (2006.01)

(52) U.S. Cl. .................. 382/107; 382/194; 382/199; 382/103; 382/181; 382/305; 382/309; 382/310; 382/311; 348/240; 707/6; 707/8; 707/9; 707/10; 358/403

(58) Field of Classification Search ............... 382/194, 382/199, 103, 107, 181, 309–311, 305; 358/403; 707/6–10; 348/240
See application file for complete search history.

(56) References Cited

U.S. PATENT DOCUMENTS 5,019,975 A * 5/1991 Mukai .......................... 707/7

(Continued)

FOREIGN PATENT DOCUMENTS

JP 64-72286 A 3/1989

(Continued)

OTHER PUBLICATIONS

Lin, Hongwen, "Engineering Master's Dissertation: Analysis on Moving Objects of Monitoring Video", Nov. 2002, Graduate Institute of National University of Defense Technology. (English translation of relevant portions discussed in Office Action).
Chinese Office Action issued in corresponding Chinese Patent Application No. CN 2004800085610, dated Nov. 10, 2006.

*Primary Examiner*—Andrew W. Johns
*Assistant Examiner*—Nancy Bitar
(74) *Attorney, Agent, or Firm*—McDermott Will & Emery LLP

(57) ABSTRACT

An object of the invention is to provide a target travel direction detecting method capable of detecting the travel direction of efficiently detecting the travel direction of a target by using a small amount of information.

The target travel direction detecting method according to the invention generates a lightness image from each of the two color images picked up at predetermined time intervals and causes a template of n by n 105 to scan the lightness image at time t to detect a position where the target is present. Next, the values of pixels around the pixel of the position where the target is detected are stored into the template 105. The template 105 storing the pixel values is used to scan the lightness image at time t+1 and detect a pixel that matches each pixel value of the template 105. Then, the target is plotted for each travel direction at a pixel position matching the template 105 on the lightness image at time t+1 to create a travel-direction-extracted image.

11 Claims, 5 Drawing Sheets

U.S. PATENT DOCUMENTS

| | | | |
|---|---|---|---|
| 6,021,221 A * | 2/2000 | Takaha | 382/199 |
| 6,217,520 B1 * | 4/2001 | He et al. | 600/467 |
| 6,470,151 B1 * | 10/2002 | Ohsawa | 396/311 |
| 6,473,198 B1 * | 10/2002 | Matama | 358/1.9 |
| 6,674,902 B1 * | 1/2004 | Kondo et al. | 382/199 |
| 6,690,825 B1 * | 2/2004 | Nakayama | 382/190 |
| 6,934,414 B2 * | 8/2005 | Kondo et al. | 382/199 |
| 2002/0076106 A1 * | 6/2002 | Kondo et al. | 382/194 |
| 2005/0049478 A1 * | 3/2005 | Kuduvalli et al. | 600/407 |

FOREIGN PATENT DOCUMENTS

| | | | |
|---|---|---|---|
| JP | 11-96376 A | | 4/1999 |
| JP | 2001-118182 A | | 4/2001 |
| JP | 2001118182 A | * | 4/2001 |
| JP | 2002-92613 A | | 3/2002 |
| JP | 2002-170096 A | | 6/2002 |

\* cited by examiner

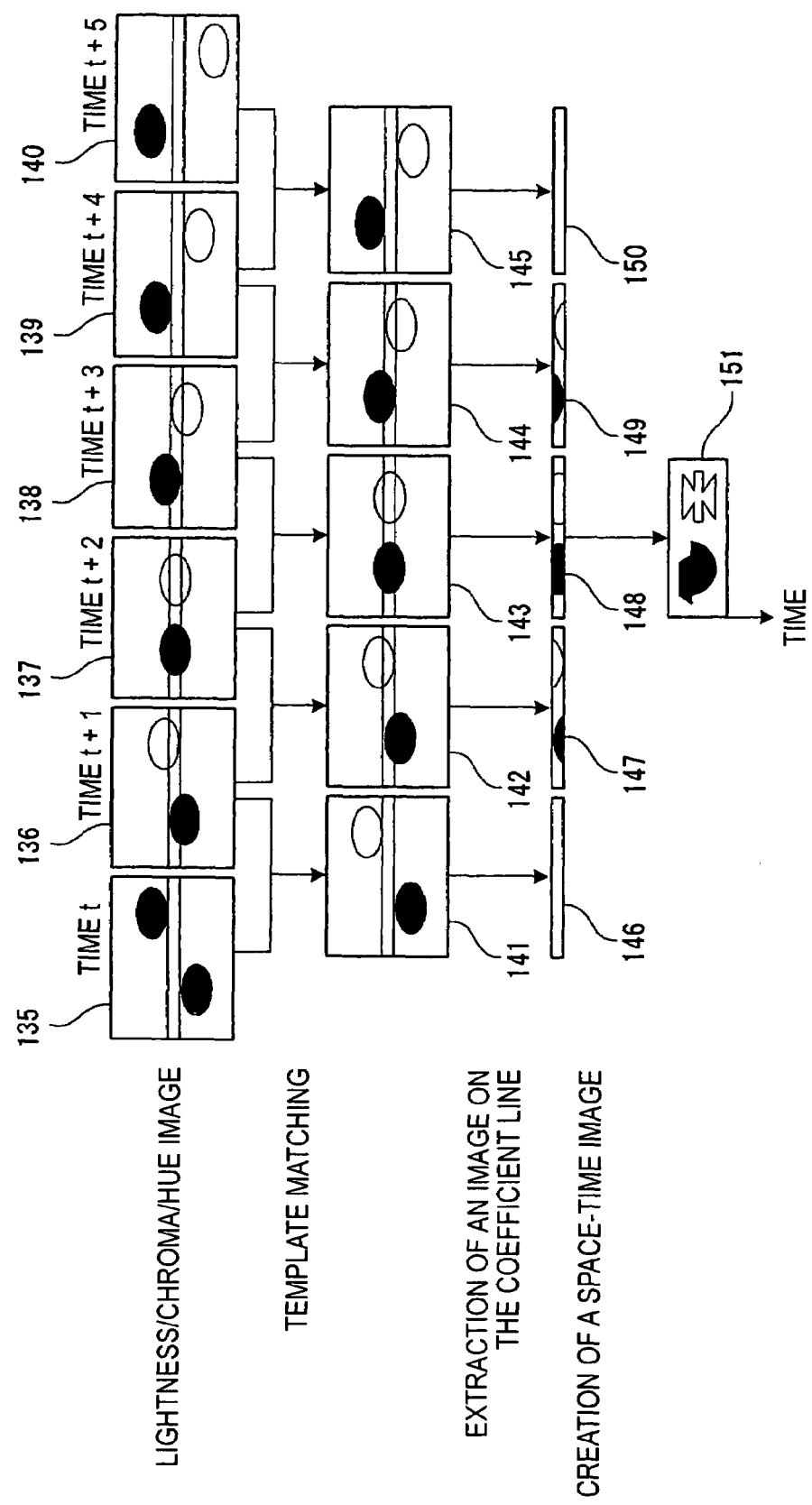

METHOD FOR DETECTING OBJECT TRAVELING DIRECTION

RELATED APPLICATION

This application is the U.S. National Phase under 35 U.S.C. § 371 of International Application No. PCT/JP2004/012689, filed on Aug. 26, 2004, which in turn claims the benefit of Japanese Application No. 2003-309902, filed on Sep. 2, 2003, the disclosures of which Applications are incorporated by reference herein.

TECHNICAL FIELD

The present invention relates to a target travel direction detecting method for detecting the travel direction of a target by processing the target image.

BACKGROUND ART

In the related art, as a technique to detect the travel direction of a target, there have been proposed a guest count detection apparatus for measuring the number of guests entering/exiting a department store, an exhibit and the like through its entrance/exit (for example, refer to JP-A-05-54142) The guest count detection apparatus disclosed in JP-A-05-54142 binarizes the difference between a first captured image and a second captured image, performs fixed differentiation to compress the number of pixels, and measure and determine the number and positions of the obtained differential pixels, thereby calculating the travel direction and number of target persons.

However, the related art technique has a problem that the amount of information is huge since the difference between all pixels in the first image and the second image in order to detect the travel direction of persons.

The invention has been accomplished in view of the related art problem and has as an object to provide a target travel direction detecting method capable of detecting the travel direction of a target by using a small amount of information.

DISCLOSURE OF THE INVENTION

A target travel direction detecting method according to the invention comprises: an image acquiring step of acquiring an image including a target picked up at predetermined time intervals; an extracted image creating step of creating an image including an arbitrary component extracted from the image; a target position detecting step of causing a matrix template to scan the extracted image at time t to detect the position of the target; a pixel value storing step of storing each pixel value of the extracted image at time t into the template; a value-matching pixel detecting step of causing a template storing the pixel value to scan the extracted image at time t+1 to detect the position of a pixel whose value matches a pixel value of the template; and a travel-direction-extracted image creating step of plotting a pixel value set to accordance with the travel direction of the target at the same coordinate position as the pixel position detected in the value-matching pixel detecting step to create a travel-direction-extracted image.

With this configuration, the value-matching pixel detecting step detects a position where the pixel value of an extracted image at time t stored into the template matches the pixel value of an extracted image at time t+1. This efficiently detects the travel direction of a target by using a small amount of information.

A target travel direction detecting method according to the invention comprises: an image acquiring step of acquiring an image including a target picked up at predetermined time intervals; an extracted image creating step of creating respective images including arbitrary components extracted from the image; a target position detecting step of respectively causing a matrix template to scan each of the extracted images at time t to respectively detect the position of the target; a pixel value storing step of storing each pixel value of each of the extracted images at time t into each of the templates; a value-matching pixel detecting step of causing each template storing the pixel value to scan each of the extracted images at time t+1 to respectively detect the position of a pixel whose value matches each pixel value of each of the templates; and a travel-direction-extracted image creating step of plotting a pixel value set to accordance with the travel direction of the target at the same coordinate position as each of the pixel positions detected in the value-matching pixel detecting step to respectively create a plurality of travel-direction-extracted images and obtain, per pixel, the mean value of the plurality of travel-direction-extracted images in order to create a complex travel-direction-extracted image.

With this configuration, it is possible to detect the travel direction of a target based on an image including a plurality of extracted components, thereby enhancing the accuracy.

In the target travel direction detecting method according to the invention, the travel-direction-extracted image creating step includes a speed calculating step of obtaining a speed of the target based on the distance between the position of a first center of gravity as a center of gravity of the target in a first travel-direction-extracted image created based on an image picked up at time t and an image picked up at time t+1, and the position of a second center of gravity as a center of gravity of the target in a second travel-direction-extracted image created based on an image picked up at time t+1 and an image picked up at time t+2.

With this configuration, it is possible to obtain, in the speed calculating step, the distance traveled by the target from time t+1 to time t+2 and the travel speed.

In the target travel direction detecting method according to the invention, the extracted image creating step selects and extracts a lightness component, a hue component and a chroma component from a color image.

With this configuration, it is possible to use three elements of color to efficiently detect the travel direction of a target with a small amount of information.

Further, the target travel direction detecting method according to the invention comprises a space-time image creating step of creating a space-time image where images in a predetermined area extracted from each of the travel-direction-extracted images created in the travel-direction-extracted image creating step are arranged in chronological order.

With this configuration, it is possible to readily check the direction in which a target traveled, the time the target traveled, and the speed at which the target traveled based on a space-time image.

BRIEF DESCRIPTION OF THE DRAWINGS

FIG. 5 illustrates the operation of a target travel direction detection apparatus according to Embodiment 4 of the invention;

In the figures, a numeral 101, 102, 107, 108, 120, 121 presents a color image, 103a, 103b, 104a, 104b, 109a, 109b, 110a, 110b, 122a, 122b, 123a, 123b a lightness image, 111a, 111b, 112a, 112b, 124a, 124b, 125a, 125b a chroma image, 105, 113, 114, 128, 129, 130 a template, 106 a travel-direction-extracted image, 115, 131 a lightness information travel-direction-extracted image, 116, 132 a chroma information travel-direction-extracted image, 126a, 126b, 127a, 127b a hue image, 133 a hue information travel-direction-extracted image, and 134 a lightness-chroma-hue travel-direction-extracted image.

BEST MODE FOR CARRYING OUT THE INVENTION

The invention detects the traveling direction of a target based on a color image including the target. Detection of the travel direction of a person walking on a road is described below based on a color image of the person picked up from above.

Embodiment 1

Figure 1:
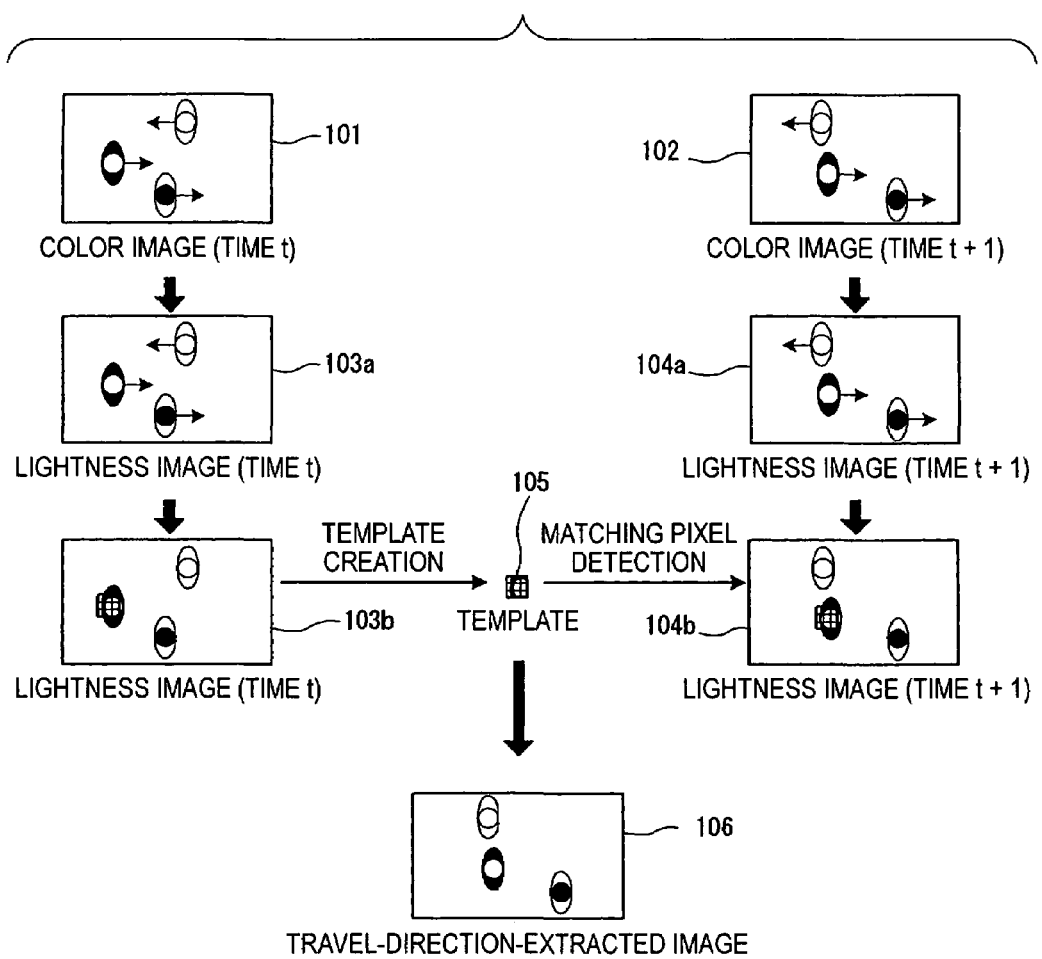
FIG. 1 illustrates the operation of a target travel direction detection apparatus according to Embodiment 1 of the invention.

Referring to FIG. 1, the target travel direction detection method according to this embodiment will be described.

As shown in FIG. 1, a lightness image is created where light information as one of the three elements of color from a color image at time t 101 and a color image at time t+1 102 picked up at predetermined time intervals by imaging apparatus such as a CCD camera. In this case, a lightness image 103 is created from the color image at time t 101 while a lightness image 104 is created from the color image at time t+1 102. After lightness images at time t and time t+1 have been respectively created, images where a target alone is extracted (target-extracted image) are respectively created. Next, a template 105 of a matrix of n by n (n being an odd number equal to 3 or more) is used to scan the lightness image (target-extracted image) at time t 103 to detect the position of the target.

When the target is detected, the values of pixels (pixel values) around the pixel of the position are stored into the template 105. Next, the template 105 storing the pixel values is used to scan the lightness image at time t+1 104 and detect a pixel that matches each pixel value of the template 105, that is, detect a matching pixel. A dot is plotted in the same coordinate position as the pixel whose value matches a pixel value of the template 105. There are three targets in FIG. 1 so that a template is created for each of them and each template is used for scanning, followed by plotting of points.

Plotting of points in coordinates corresponding to pixels is made for each travel direction. In the case of FIG. 1, the targets travel in horizontal direction of the screen. In case a position matching between a pixel in the template 105 created based on the image at time t and the image at time t+1 travels from left to right on the screen (that is, in case the target travels from left to right), a pixel corresponding to the area where the target is present is assumed to have a pixel value "255". In case the position travels from right to left on the screen (that is, in case the target travels from right to left), a pixel corresponding to the area where the target is present is assumed to have a pixel value "0". A pixel that failed in matching by way of the template 105 is assumed to have a pixel value "125". In this way, the pixel value of a coordinate corresponding to the area where the target is present is determined based on a matching pixel and a travel-direction-extracted image 106 is created. With this approach, the pixel value of a target traveling from right to left on the screen (the highest target in FIG. 1) is "0" so that the target appears in white in the travel-direction-extracted image 106. The targets traveling from left to right on the screen (the second and third highest targets in FIG. 1) appear in black. This shows that the second and third highest targets alone are traveling from left to right. This rule also applies the case where a target travels in vertical direction.

In this way, according to the target travel direction detection apparatus of this embodiment, the lightness image of each of the two color images picked up at predetermined time intervals is generated. A template of n by n 105 is used to scan the previously mentioned lightness image (target-extracted image) to detect a position where the target is present. The pixel values around the position where the target was detected are stored into the template 105. The template 105 storing the pixel values is used to scan the lightness image (target-extracted image) at time t+1 and detect a pixel that matches each pixel value of the template 105. Based on the pixel position matching the template 105 on the lightness image (target-extracted image) at time t+1, a pixel value is set to the area of the target for each travel direction of the target in order to create a travel-direction-extracted image 106.

This eliminates the need for obtaining the difference concerning all pixels of an image, thereby efficiently detecting the travel direction of a target by using a small amount of information.

While only the lightness information is extracted from a color image for processing in this embodiment, chroma or hue information may be used instead.

While only the travel direction of a target is detected in this embodiment, a travel speed may be also detected. The center of gravity of a target is detected for each of an image where the travel direction of a target between time t and t+1 is extracted and an image where the travel direction of the target between time t+1 and t+2 is extracted. Next, the travel distance of the center of gravity is obtained. The travel distance is divided by its travel time to obtain the travel speed of the target.

Embodiment 2

Figure 2:
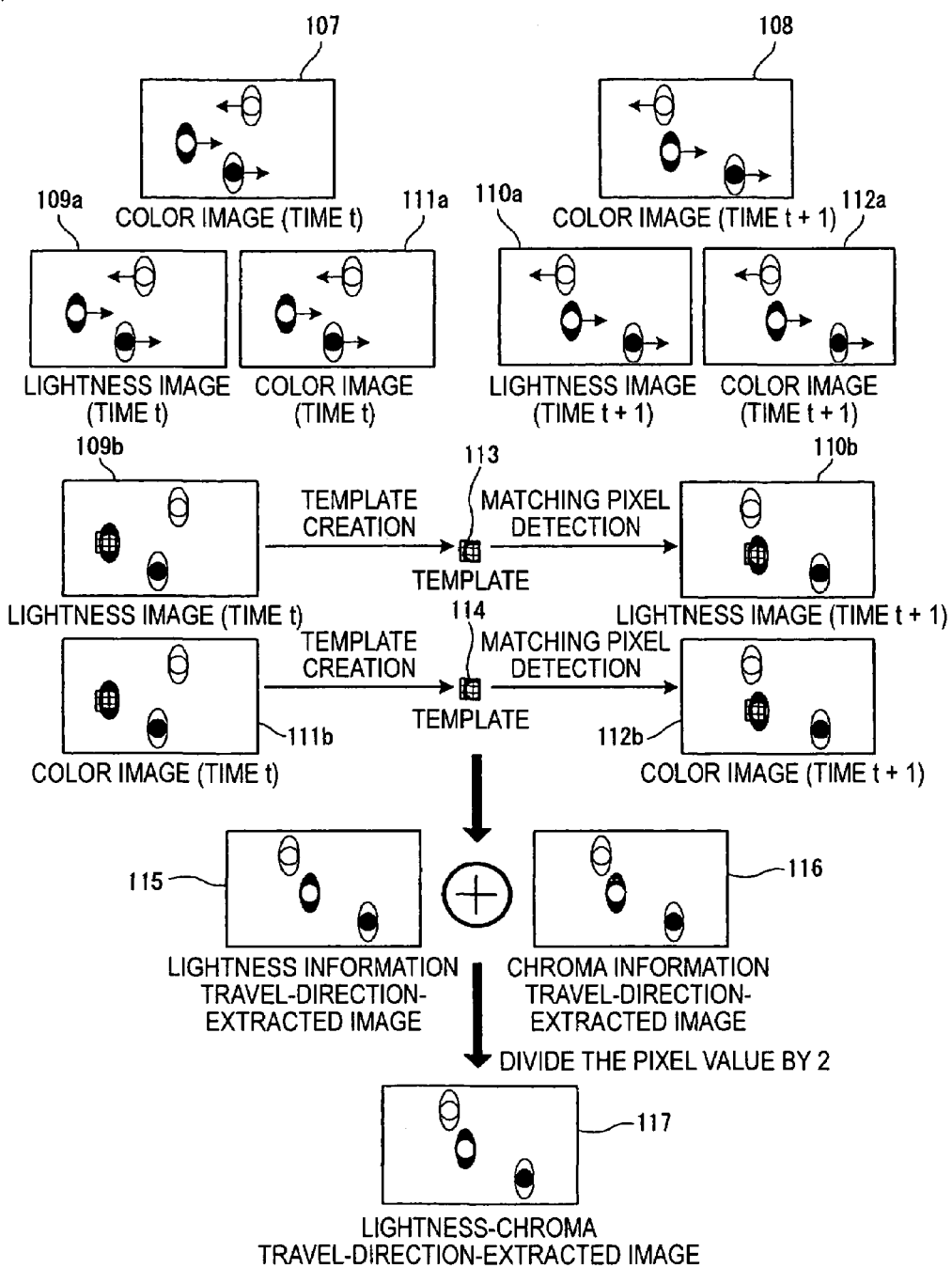
FIG. 2 illustrates the operation of a target travel direction detection apparatus according to Embodiment 2 of the invention.

FIG. 2 illustrates the operation of a target travel direction detection apparatus according to Embodiment 2 of the invention. The target travel direction detection apparatus according to this embodiment is the same as that according to Embodiment 1 except that the features are different.

As shown in FIG. 2, the technique to extract the travel direction by the target travel direction detection apparatus according to this embodiment aims at enhancing the accuracy by creating a chroma image that is based on a chroma as one of the three elements of color, as well as a lightness image.

From a color image at time t 107 and a color image at time t+1 108 picked at predetermined time intervals, lightness images 109 (time t) and 110 (time t+1) where lightness information alone is extracted and chroma images 111 (time t) and 112 (time t+1) where chroma images alone are extracted are created. Further, a template of n by n 113 is created for the lightness image at time t 109 and a template of n by n 114 is created for the chroma image at time t 111. The templates 113, 114 are used to scan the lightness image at time t 109 and the chroma image at time t 111 and create an image where the target alone is extracted (target-extracted image). The values of pixels (pixel values) around the pixel of the position where the target was detected are stored into the templates 113, 114. Next, the template 113 is used to scan the lightness image at time t+1 110. The template 114 is used to scan the chroma image at time t+1 111. Then, a pixel that matches each pixel value of the templates 113, 114, that is, a matching pixel, is detected.

A dot is plotted in the same coordinate position as the pixel whose value matches a pixel value of the template 113 to create a lightness information travel-direction-extracted image 115. A dot is plotted in the same coordinate position as the pixel whose value matches a pixel value of the template 114 to create a chroma information travel-direction-extracted image 116.

Same as Embodiment 1, a pixel value is discriminated for each travel direction. In the case of FIG. 2 also, targets are traveling in horizontal direction on the screen. In case a position matching between a pixel in the template 113 created based on the image at time t and the image at time t+1 travels from left to right on the screen, a pixel corresponding to the area where the target is present is assumed to have a pixel value "255". In case the position travels from right to left on the screen, a pixel corresponding to the area where the target is present is assumed to have a pixel value "0". A pixel that failed in matching by way of the template 113 is assumed to have a pixel value "125". In this way, the pixel value of a target traveling from right to left on the screen (the highest target in FIG. 2) is "0" so that the target appears in white in the lightness information travel-direction-extracted image 115. The targets traveling from left to right on the screen (the second and third highest targets in FIG. 2) appear in black. This shows that the second and third highest targets alone are traveling from left to right.

In case a position matching between a pixel in the template 114 created based on the image at time t and the image at time t+1 travels from left to right on the screen, a pixel corresponding to the area where the target is present is assumed to have a pixel value "255". In case the position travels from right to left on the screen, a pixel corresponding to the area where the target is present is assumed to have a pixel value "0". A pixel that failed in matching by way of the template 114 is assumed to have a pixel value "125". In this way, the pixel value of a target traveling from right to left on the screen (the highest target in FIG. 2) is "0" so that the target appears in white in the chroma information travel-direction-extracted image 115. The targets traveling from left to right on the screen (the second and third highest targets in FIG. 2) appear in black.

The pixel values of a same coordinate between the lightness information travel-direction-extracted image 115 and the chroma information travel-direction-extracted image 116 where the travel direction is extracted are added together and divided by 2 to create a lightness-chroma travel-direction-extracted image 117 that uses lightness information and chroma information.

In this way, according to the target travel direction detection apparatus of this embodiment, a lightness image and a chrome image of each of the two color images picked up at predetermined intervals are generated. For the lightness image, a template of n by n 113 is used to scan the previously mentioned lightness image (target-extracted image) at time t to detect a position where the target is present. The pixel values around the position where the target was detected are stored into the template 113. The template 113 storing the pixel values is used to scan the lightness image at time t+1 and detect a pixel that matches each pixel value of the template 113. Based on the pixel position corresponding to a position where the template created at time t has matched at time t+1, a pixel value is set to the area of the target for each travel direction of the target in order to create a lightness information travel-direction-extracted image 115. For the chroma image, a template of n by n 114 is used to scan the previously mentioned chroma image (target-extracted image) at time t to detect a position where the target is present. The pixel values around the position where the target was detected are stored into the template 114. The template 114 storing the pixel values is used to scan the chroma image (target-extracted image) at time t+1 and detect a pixel that matches each pixel value of the template 114. Based on the pixel position corresponding to a position where the template created at time t has matched at time t+1, a pixel value is set to the area of the target for each travel direction of the target in order to create a chroma information travel-direction-extracted image 116. Based on the lightness information travel-direction-extracted image. 115 and the chroma information travel-direction-extracted image 116, a lightness-chroma travel-direction-extracted image 117 is created. This efficiently detects the travel direction of a target by using a small amount of information, thereby enhancing its accuracy.

While lightness information and chroma information are used for processing in this embodiment, a combination of lightness information and hue information or chroma information and hue information may be used instead.

While only the travel direction of a target is detected in this embodiment, a travel speed may be also detected. The center of gravity of a target is detected for each of a lightness-chroma travel-direction-extracted image where the travel direction of a target between time t and t+1 is extracted and a lightness-chroma travel-direction-extracted image where the travel direction of a target between time t+1 and t+2 is extracted. Next, the travel distance of the center of gravity is obtained. The travel distance is divided by its travel time to obtain the travel speed of the target.

Embodiment 3

Figure 3:
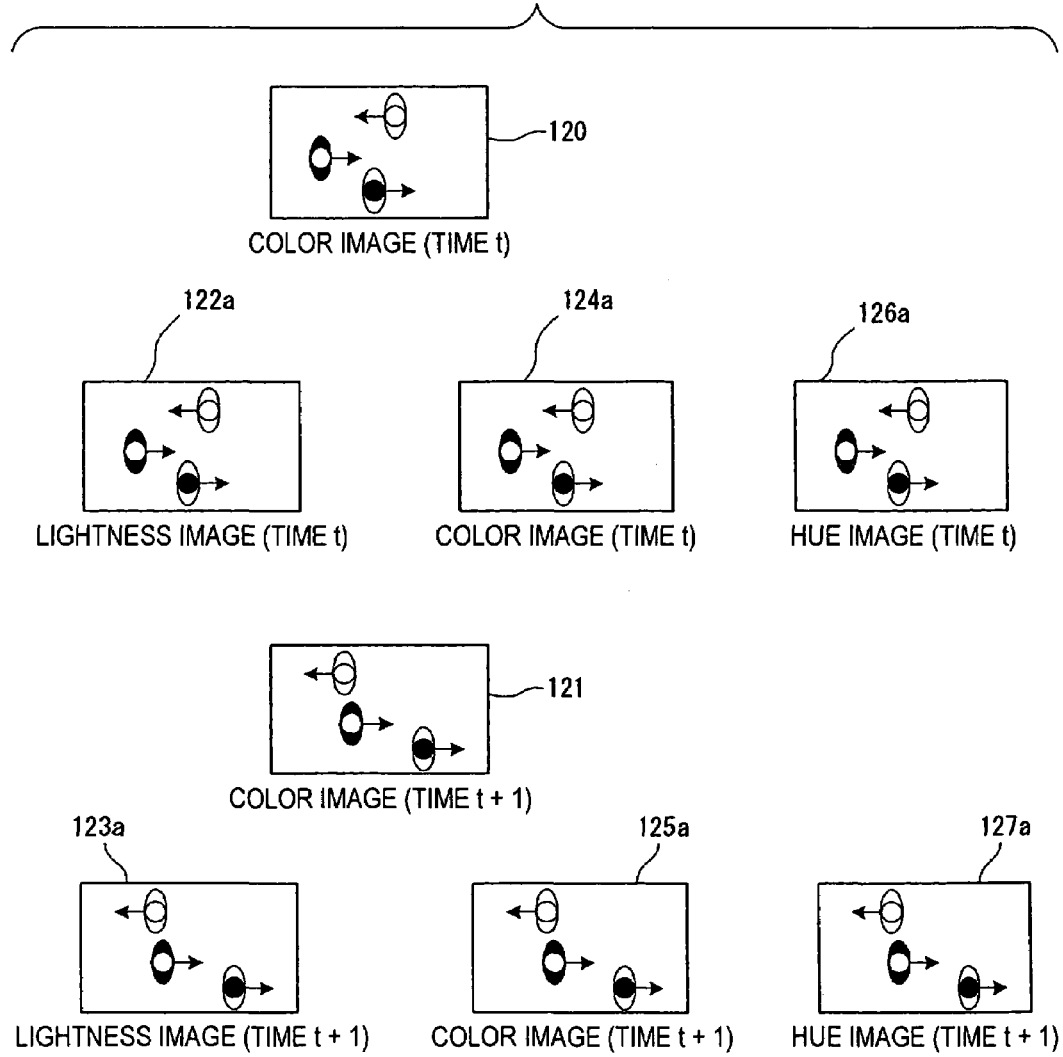
FIG. 3 illustrates the operation of a target travel direction detection apparatus according to Embodiment 3 of the invention.
Figure 4:
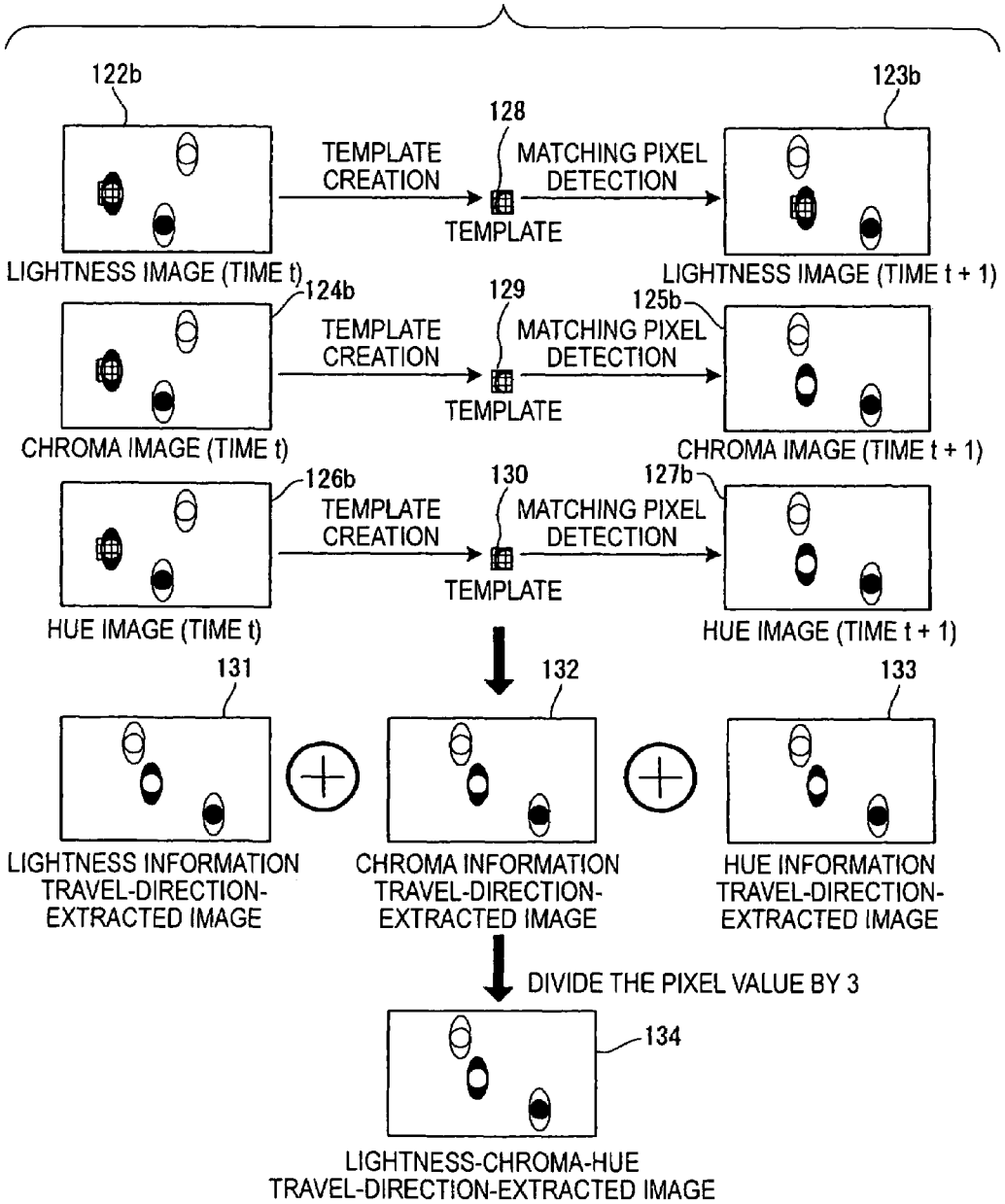
FIG. 4 illustrates the operation of the target travel direction detection apparatus according to Embodiment 3 of the invention.

FIGS. 3 and 4 illustrate the operation of a target travel direction detection apparatus according to Embodiment 3 of the invention. The target travel direction detection apparatus according to this embodiment is the same as that according to Embodiment 1 except that the features are different.

As shown in FIGS. 3 and 4, the technique to extract the travel direction by the target travel direction detection apparatus according to this embodiment aims at enhancing the accuracy by creating a chroma image and a hue image that are based on a chroma and a hue that belong to three elements of color, as well as a lightness image.

From a color image at time t 120 and a color image at time t+1 121 picked at predetermined time intervals, lightness images 122 (time t) and 123 (time t+1) where lightness information alone is extracted, chroma images 124 (time t) and 125 (time t+1) where chroma information alone are extracted, and hue images 126 (time t) and 127 (time t+1) are created. Further, a template of n by n 128 is created for the lightness image at time t 122, a template of n by n 129 is created for the chroma image at time t 124, and a template of n by n 130 is created for the hue image at time t 126.

The templates 128, 129, 130 are used to scan the lightness image at time t 122, the chroma image 124 and the hue image 126 and create an image where the target alone is extracted (target-extracted image). The values of pixels (pixel values) around the pixel of the position where the target was detected are stored into the templates 128, 129, 130. Next, the template 128 is used to scan the lightness image at time t+1 123. The template 129 is used to scan the chroma image at time t+1 125. The template 130 is used to scan the hue image at time t+1 127. Then, a pixel that matches each pixel value of the templates 128, 129, 130, that is, a matching pixel, is detected.

A dot is plotted in the same coordinate position as the pixel whose value matches a pixel value of the template 128 to create a lightness information travel-direction-extracted image 131. A dot is plotted in the same coordinate position as the pixel whose value matches a pixel value of the template 129 to create a chroma information travel-direction-extracted image 132. A dot is plotted in the same coordinate position as the pixel whose value matches a pixel value of the template 130 to create a hue information travel-direction-extracted image 133.

Same as Embodiment 1, a pixel value is discriminated for each travel direction. In the case of FIGS. 3 and 4 also, targets are traveling in horizontal direction on the screen. In case a position matching between a pixel in the template 128 created based on the image at time t and the image at time t+1 travels from left to right on the screen, a pixel corresponding to the area where the target is present is assumed to have a pixel value "255". In case the position travels from right to left on the screen, a pixel corresponding to the area where the target is present is assumed to have a pixel value "0". A pixel that failed in matching by way of the template 128 is assumed to have a pixel value "125". In this way, the pixel value of a target traveling from right to left on the screen (the highest target in FIGS. 3 and 4) is "0" so that the target appears in white in the lightness information travel-direction-extracted image 131. The targets traveling from left to right on the screen (the second and third highest targets in FIGS. 3 and 4) appear in black.

In case a position matching between a pixel in the template 129 created based on the image at time t and the image at time t+1 travels from left to right on the screen, a pixel corresponding to the area where the target is present is assumed to have a pixel value "255". In case the position travels from right to left on the screen, a pixel corresponding to the area where the target is present is assumed to have a pixel value "0". A pixel that failed in matching by way of the template 129 is assumed to have a pixel value "125". In this way, the pixel value of a target traveling from right to left on the screen (the highest target in FIGS. 3 and 4) is "0" so that the target appears in white in the chroma information travel-direction-extracted image 132. The targets traveling from left to right on the screen (the second and third highest. targets in FIGS. 3 and 4) appear in black.

In case a position matching between a pixel in the template 130 created based on the image at time t and the image at time t+1 travels from left to right on the screen, a pixel corresponding to the area where the target is present is assumed to have a pixel value "255". In case the position travels from right to left on the screen, a pixel corresponding to the area where the target is present is assumed to have a pixel value "0". A pixel that failed in matching by way of the template 130 is assumed to have a pixel value "125". In this way, the pixel value of a target traveling from right to left on the screen (the highest target in FIGS. 3 and 4) is "0" so that the target appears in white in the hue information travel-direction-extracted image 133. The targets traveling from left to right on the screen (the second and third highest targets in FIGS. 3 and 4) appear in black.

The pixel values of a same coordinate between the lightness information travel-direction-extracted image 131, the chroma information travel-direction-extracted image 132 and the hue information travel-direction-extracted image 133 where the travel direction is extracted are added together and divided by 3 to create a lightness-chroma-hue travel-direction-extracted image 134 that uses lightness information, chroma information and hue information.

In this way, according to the target travel direction detection apparatus of this embodiment, a lightness image, a chrome image and a hue image of each of the two color images picked up at predetermined intervals are generated. For the lightness image, a template of n by n 128 is used to scan the previously mentioned lightness image (target-extracted image) at time t to detect a position where the target is present. The pixel values around the position where the target was detected are stored into the template 128. The template 128 storing the pixel values is used to scan the lightness image at time t+1 and detect a pixel that matches each pixel value of the template 128. Based on the pixel position corresponding to a position where the template created at time t has matched at time t+1, a pixel value is set to the area of the target for each travel direction of the target in order to create a lightness information travel-direction-extracted image 131. For the chroma image, a template of n by n 129 is used to scan the previously mentioned chroma image (target-extracted image) at time t to detect a position where the target is present. The pixel values around the position where the target was detected are stored into the template 129. The template 129 storing the pixel values is used to scan the chroma image (target-extracted image) at time t+1 and detect a pixel that matches each pixel value of the template 129. Based on the pixel position corresponding to a position where the template created at time t has matched at time t+1, a pixel value is set to the area of the target for each travel direction of the target in order to create a chroma information travel-direction-extracted image 132. For the hue image, a template of n by n 130 is used to scan the previously mentioned chroma image (target-extracted image) at time t to detect a position where the target is present. The pixel values around the position where the target was detected are stored into the template 130. The template 129 storing the pixel values is used to scan the hue image (target-extracted image) at time t+1 and detect a pixel that matches each pixel value of the template 130. Based on the pixel position corresponding to a position where the template created at time t has matched at time t+1, a pixel value is set to the area of the target for each travel direction of the target in order to create a hue information travel-direction-extracted image 133. Based on the lightness information travel-direction-extracted image 131, the chroma information travel-direction-extracted image 132 and the hue information travel-direction-extracted image 133, a lightness-chroma-hue travel-direction-extracted image 134 is created.

This efficiently detects the travel direction of a target by using a small amount of information, thereby enhancing its accuracy.

While only the travel direction of a target is detected in this embodiment, a travel speed may be also detected. The center of gravity of a target is detected for each of a lightness-chroma-hue travel-direction-extracted image where the travel direction of a target between time t and t+1 is extracted and a lightness-chroma-hue travel-direction-extracted image where the travel direction of a target between time t+1 and t+2 is extracted. Next, the travel distance of the center of gravity is obtained. The travel distance is divided by its travel time to obtain the travel speed of the target.

Embodiment 4

FIG. 5 illustrates the operation of a space-time image creation apparatus according to Embodiment 4 of the invention. The space-time image creation apparatus of this embodiment creates a space-time image from a travel-direction-extracted image created using a method shown in Embodiments 1 through 3.

Travel-direction-extracted images 141, 142, 143, 144, 145 are created by using the method described in Embodiments 1, 2 and 3 from the image at time t 135, the image at t+1 136, the image at t+2 137, the image at t+3 138, the image at t+4 139 and the image at t+5 140 picked up at predetermined time intervals and converted to a lightness image, a chroma image or a hue image.

Next, images 146, 147, 148, 149, 150 where the pixels of an arbitrarily specified area are respectively extracted from the travel-direction-extracted images 141, 142, 143, 144, 145. The size and position of the area in each travel-direction-extracted image are the same. The images 146, 147, 148, 149, 150 are chronologically arranged to create a space-time image 151.

In this example, the pixels of an area in the shape of a slip horizontally crossing the center of a travel-direction-extracted image are extracted from each travel-direction-extracted image. Starting from the image 141 (image on a coefficient line) that is based on the image at time t 135 and the image at time t+1 136 to the image 150 that is based on the image at time t+4 139 and the image at time t+5 146, the images are chronologically arranged from the innermost section toward you to create a space-time image 151.

The space-time image stores as pixel data the travel direction data of a target that has passed through the area from certain time t to time t+5. The pixel data is easy to recognize visually. So that it is possible to readily recognize the travel direction, passage count and passage speed pf a target that has passed through the area from certain time t to time t+5.

This efficiently detects the travel direction of a target by using a small amount of information, thereby enhancing its accuracy.

While only the travel direction of a target is detected in this embodiment, a travel speed may be also detected. The center of gravity of a target is detected for each of a lightness-chroma-hue travel-direction-extracted image where the travel direction of a target between time t and t+1 is extracted and a lightness-chroma-hue travel-direction-extracted image where the travel direction of a target between time t+1 and t+2 is extracted. Next, the travel distance of the center of gravity is obtained. The travel distance is divided by its travel time to obtain the travel speed of the target.

While the target is a person in the foregoing description, the target may be a vehicle and the like.

While the invention has been described in detail and in terms of its specific embodiments, those skilled in the art will recognize that various changes and modifications can be made in it without departing the spirit and scope thereof.

This application is based on Japanese Patent Application No. 2003-309902 filed Sep. 2, 2003, the disclosure of which is incorporated herein by reference.

INDUSTRIAL APPLICABILITY

The target travel direction detecting method according to the invention has an advantage of efficiently detecting the travel direction of a target by using a small amount of information and is useful for example in measuring the number of guests entering/exiting a department store, an exhibit and the like through its entrance/exit.

The invention claimed is:

1. A target travel direction detecting method comprising:
an image acquiring step of acquiring an image including a target picked up at predetermined time intervals;
an extracted image creating step of creating an image including an arbitrary component extracted from the image;
a target position detecting step of causing a matrix template to scan the extracted image at time t to detect the position of the target;
a pixel value storing step of storing each pixel value of the extracted image at time t into the template;
a value-matching pixel detecting step of causing a template storing the pixel value to scan the extracted image at time t+1 to detect the position of a pixel whose value matches a pixel value of the template; and
a travel-direction-extracted image creating step of plotting a pixel value set to accordance with the travel direction of the target at the same coordinate position as the pixel position detected in the value-matching pixel detecting step to create a travel-direction-extracted image.

2. A target travel direction detecting method comprising:
an image acquiring step of acquiring an image including a target picked up at predetermined time intervals;
an extracted image creating step of creating respective images including arbitrary components extracted from the image;
a target position detecting step of respectively causing a matrix template to scan each of the extracted images at time t to respectively detect the position of the target;
a pixel value storing step of storing each pixel value of each of the extracted images at time t into each of the templates;
a value-matching pixel detecting step of causing each template storing the pixel value to scan each of the extracted images at time t+1 to respectively detect the position of a pixel whose value matches each pixel value of each of the templates; and
a travel-direction-extracted image creating step of plotting a pixel value set to accordance with the travel direction of the target at the same coordinate position as each of the pixel positions detected in the value-matching pixel detecting step to respectively create a plurality of travel-direction-extracted images and obtain, per pixel, the mean value of the plurality of travel-direction-extracted images in order to create a complex travel-direction-extracted image.

3. The target travel direction detecting method according to claim 1, wherein
the travel-direction-extracted image creating step includes a speed calculating step of obtaining a speed of the target based on the distance between the position of a first center of gravity as a center of gravity of the target in a first travel-direction-extracted image created based on an image picked up at time t and an image picked up at time t+1, and the position of a second center of gravity as a center of gravity of the target in a second travel-direction-extracted image created based on an image picked up at time t+1 and an image picked up at time t+2.

4. The target travel direction detecting method according to claim 1, wherein
the extracted image creating step selects and extracts a lightness component, a hue component and a chroma component from a color image.

5. The target travel direction detecting method according to claim 1, comprising
a space-time image creating step of creating a space-time image where images in a predetermined area extracted from each of the travel-direction-extracted images created in the travel-direction-extracted image creating step are arranged in chronological order.

6. The target travel direction detecting method according to claim 2, wherein
the travel-direction-extracted image creating step includes a speed calculating step of obtaining a speed of the target based on the distance between the position of a first center of gravity as a center of gravity of the target in a first travel-direction-extracted image created based on an image picked up at time t and an image picked up at time t+1, and the position of a second center of gravity as a center of gravity of the target in a second travel-direction-extracted image created based on an image picked up at time t+1 and an image picked up at time t+2.

7. The target travel direction detecting method according to claim 2, wherein
the extracted image creating step selects and extracts a lightness component, a hue component and a chroma component from a color image.

8. The target travel direction detecting method according to claim 3, wherein
the extracted image creating step selects and extracts a lightness component, a hue component and a chroma component from a color image.

9. The target travel direction detecting method according to claim 2, comprising
a space-time image creating step of creating a space-time image where images in a predetermined area extracted from each of the travel-direction-extracted images created in the travel-direction-extracted image creating step are arranged in chronological order.

10. The target travel direction detecting method according to claim 3, comprising
a space-time image creating step of creating a space-time image where images in a predetermined area extracted from each of the travel-direction-extracted images created in the travel-direction-extracted image creating step are arranged in chronological order.

11. The target travel direction detecting method according to claim 4 comprising; a space-time image creating step of creating a space time image where images in a predetermined area extracted from each of the travel-direction-extracted images created in the travel-direction extracted image creating step are arranged in chronological order.

* * * * *